3,367,765
METHOD OF CONTROLLING THE GROWTH OF NOXIOUS PLANTS
Charles D. Nelson and John I. Toohey, both c/o Queen's University, Kingston, Ontario, Canada
No Drawing. Filed July 8, 1964, Ser. No. 381,254
8 Claims. (Cl. 71—67)

ABSTRACT OF THE DISCLOSURE

A method of controlling the growth of algae and noxious weeds by applying 1-phenazine carboxylic acid and hydroxy-phenazine-carboxylic acid to a growth environment such as water or soil in the proportion of at least one-third of a pound per acre of the environment.

---

This invention relates to a method of controlling the growth of noxious plants.

Herbicides are, of course, widely employed to control or eliminate the growth of noxious weeds. Some herbicides are quite effective in respect to certain plants but of limited effectiveness in respect to others. Moreover, many herbicides must be used with care since they are toxic to animal life.

It is an object of this invention to provide a method of satisfactorily controlling the growth of algae and noxious weeds such as mustard and pigweed.

A more specific object is to provide a method as set forth which makes use of a herbicide which is highly effective, which is available by chemical synthesis or by bacterial fermentation, and which may be employed with no apparent injury to fish, insects or mammals.

The invention resides in a method of controlling the growth of algae and noxious weeds which comprises applying a phenazine to the growth environment of algae and noxious weeds.

The algicide or herbicide employed in accordance with the invention is, as set forth above, a phenazine such as 1-phenazine-carboxylic acid and hydroxy-phenazine-carboxylic acid. The first of these two compounds may be prepared by chemical synthesis from nitrobenzene and anthranilic acid. Moreover, these compounds are formed in abundance by strains of the bacterium *Pseudomonas aureofaciens* when grown on a relatively simple and inexpensive medium. Thus, they are readily available.

The following is a description of a method for chemical synthesis of 1-phenazine-carboxylic acid:

25 g. of anthranilic acid are mixed with 25 g. of freshly distilled nitrobenzene and 100 g. of potassium hydroxide in a flask. The flask is provided with a condenser and heated to 145° C. in a heating bath. The bath temperature is then raised to 160° over a half hour period. The flask is cooled to 100° and the volatile components are removed in a vigorous current of steam. When the flask is cooled after steam distillation, the potassium salt of 1-phenazine-carboxylic acid crystallizes out. It is collected by filtration, washed with methanol on the filter until the colour is green-yellow. The potassium salt is dissolved in water and free 1-phenazine-carboxylic acid is precipitated by acidifying the solution with hydrochloric acid. The material is re-crystallized from acetic acid or methanol.

The following is a description of a bacterial method of producing pure samples of the phenazine-carboxylic acids.

The medium used for batch culture of *Pseudomonas aureofaciens* contains per litre:

| | |
|---|---|
| $KNO_3$ | g__ 5 |
| Sucrose | g__ 30 |
| Yeast extract | g__ 10 |
| $K_2HPO_4$ | g__ 12.5 |
| $KH_2PO_4$ | g__ 3.8 |
| NaCl | g__ 0.5 |
| $MgSO_4.7H_2O$ | g__ 0.5 |
| $FeSO_4.7H_2O$ | g__ 0.01 |
| $CaCl_2$ | g__ 0.02 |
| Distilled water | litre__ 1 |
| pH | 7.0 |

250 ml. of this medium in 1 litre flasks are inoculated with 20 ml. of fresh culture in the same medium. All cultures are shaken on a rotary shaker at 240 cycles per minute at 30° C. Large cultures under these conditions reach maximum turbidity ($\sim$700 Klett units at 660 m$\mu$) in 12 to 18 hours.

The whole culture is acidified to pH 4 by adding approximately 2 ml. of concentrated acetic acid per litre of culture and is extracted with 200 ml. of benzene per litre of culture in a separatory funnel. Extraction is almost complete in the first shaking but usually the aqueous phase is re-extracted with another 100 ml. of benzene. The benzene phase contains an emulsion of water and in order to break this emulsion the extract is frozen. Extracts are stored in the frozen state.

After thawing, the benzene is separated from the residual water and filtered through Whatman #1 paper on a Buchner funnel with suction. The benzene is removed in vacuo and recycled. The dried residue is re-crystallized from methanol. This procedure yields fairly pure crystals of the mixed phenazine-carboxylic acids. To obtain pure samples of the separate compounds the benzene extract is treated as follows:

The benzene phase is extracted with 0.1 M $K_2HPO_4$, pH 9 (200 ml. per litre of benzene), followed by a second extraction using 100 ml. of phosphate per litre of benzene. The combined aqueous phase is bright orange in colour and has a pH of $\sim$8.

The benzene phase is then extracted with 0.1 M $NH_4OH$ solution, first with 200 ml. per litre of benzene followed by 100 ml. per litre of benzene. The combined ammonia extract is bright red in colour, the pH is $\sim$10.5.

The phosphate extract is acidified to pH 4 by adding 1.2 ml. of concentrated acetic acid for each 100 ml. of solution and extracted with benzene (20 ml. for each 100 ml. of water). The benzene extract is evaporated with gentle heating (40° C.) in a stream of air until it is saturated and crystals begin to form. The solution is then heated to 60° C. to ensure solution of all crystals and it is streaked on sheets of Whatman #3 paper, 27.5 cm. x 47 cm. Up to 50 mg. of pigment is streaked onto each sheet. The chromatograms are developed in an ascending system containing: distilled water 1 litre, methanol 10 ml., ammonium hydroxide 1 ml. Six hours are required for the solvent front to reach the top of the paper. After the papers have dried, the upper half of each paper is occupied by an intense yellow band with thousands of yellow crystals embedded throughout the cellulose fibres. There is also a weak orange band below the yellow one. The yellow band is cut out, the paper is cut into 1 inch squares and extracted with the same solvent that was used to develop the chromatograms using approximately 60 ml. for each sheet of paper. The paper is stirred in the solvent to break it up and the pulp is filtered with suction on a Buchner funnel. The pulp is washed on the funnel with small batches of the same solvent.

The pH of the filtrate is adjusted to 4 with concentrated acetic acid and the filtrate is then extracted with benzene. The benzene is evaporated off in a stream of air with gentle heating. Microscopic yellow needles form as the evaporation takes place. The material is re-crystallized from methanol.

The ammonia extract is treated in the same way as the phosphate extract. The dried chromatograms in this case have a small yellow band and an intense orange band with many clumps of orange crystals embedded in the paper. The intense orange band is eluted in solvent and extracted with benzene, the orange crystals are collected by evaporating the benzene and are re-crystallized from methanol as described for the yellow compound.

The yellow Compound I is 1-phenazine-carboxylic acid and the orange Compound II is a hydroxy-phenazine-carboxylic acid.

For application as a herbicide it is unnecessary to effect purification as described above. For large scale bacterial production the following method is more practical.

The cultures are grown in a medium containing 10 g. of 10-6-4 fertilizer and 20 g. of molasses (or table sugar) per litre of tap water. The mature culture is acidified and extracted with benzene. The benzene is evaporated from the extract and the resulting crystals are used directly. Alternative to benzene extraction, the whole culture can be heated at 100° C. for 30 minutes to kill the bacteria and then dehydrated. The resulting powder might be applied as a herbicide.

Table I gives the concentrations at which the two compounds are lethal to several types of plants. The values given in the table are the concentrations at which there is complete killing or inhibition of growth.

Table II shows the results of tests conducted using the compounds produced by chemical synthesis dissolved in weak alkali and applied as a pre-emergence herbicide at 10 pounds per acre, and using a steam sterilized, sandy loam soil with a slightly acid pH.

*Table II.—Pre-emergence herbicide tests*

| Plant: | Percent kill |
|---|---|
| Cotton | 10 |
| Corn | 0 |
| Soybean | 0 |
| Crabgrass | 0 |
| Mustard | 60 |
| Pigweed | 70 |
| Ryegrass | 0 |

Table III shows the results of tests conducted using the same compounds as in Table II under the same conditions but applied as a post-emergence herbicide.

*Table III.—Post-emergence herbicide tests*

| Plant: | Percent kill |
|---|---|
| Tomato | 100 |
| Cotton | 0 |
| Bean | 0 |
| Quackgrass | 0 |
| Lamb's Quarter | 0 |
| Bindweed | 0 |
| Crabgrass | 0 |
| Fox Tail | 0 |
| Corn | 0 |
| Soybean | 0 |
| Mustard | 100 |
| Pigweed | 100 |
| Ryegrass | 0+ |

*Table I.—Toxicity of two phenazine compounds to plants and bacteria*

| | Species | Assay Method | Minimum Lethal Concentration | |
|---|---|---|---|---|
| | | | Compound I | Compound II |
| Green algae | Chlorella vulgaris | Paper disc on agar | <10 µg./7 mm. disc | <2 µg./7 mm. disc. |
| | Scenedesmus sp | do | | <2 µg./7 mm. disc. |
| Blue-green algae | Microcystis aeruginosa | Liquid culture | No effect at: 20 p.p.m | <0.1 p.p.m. |
| | Anabaena flos-aquae | do | 10 p.p.m | 1 p.p.m. |
| Higher plants | Lemna minor (pure culture) | On liquid medium | 2.5 p.p.m | 50% inhibition at conc. >2.5 p.p.m. |
| | Timothy | Grown on filter paper | 4 µg./sq. cm | 2 µg./sq. cm. |
| | Cress | do | 4 µg./sq. cm | ~10 µg./sq. cm. |
| Bacteria | Staphylococcus aureus | Liquid culture | ~200 µg./ml. (est.) | 100 µg./ml. |
| | Bacillus subtilis | do | ~300 µg./ml. (est.) | 100 µg./ml. |

It will be apparent that the minimum lethal concentrations, as set forth in Table I, may be converted to normal standard amounts used in practice. Thus, 1 p.p.m. of Compound II as used in the control of blue-green algae is 2.7 pounds per acre of water 1 foot deep, that is, 2.7 lbs./acre foot. For the control of water weeds, such as *Lemna minor*, 2.5 p.p.m. of Compound I is 6¾ lbs./acre foot. For the control of higher plants, such as timothy and cress, 4 µg./sq. cm. is ⅓ lb. per acre.

Experiments were also conducted using a crystalline material prepared by chemical synthesis from nitrobenzene and anthranilic acid. As an algicide, it was noted that there was a 50% inhibition of growth of *Scenedesmus obliquus* growing in nutrient broth and using a concentration of 0.1 to 0.2 microgram per milliliter. When the algae was grown in a synthetic medium the 50% inhibition of growth was at 0.08 microgram per milliliter. Similar results were obtained in experiments using *Chlorella pyrenoidosa*.

The compound may be used in solid form or dissolved in water or weakly alkaline solution. As a weed killer, it may be used as a pre-emergence herbicide, i.e., application to the soil before foliage appears, or as a post-emergence herbicide, i.e., direct application to the foliage after it appears.

It will be observed that the method described is highly effective in controlling the growth of algae such as may occur in pools and the like.

It will also be observed that the method described may be employed to control the growth of water weeds, such as Lemna which may occur in irrigation canals and the like.

It will also be observed that the method described may be employed to control the growth of specific weeds such as pigweed and mustard.

The compounds mentioned have been tested for toxic effect on various fish, insects and mammals and no such effect has been noted. Thus, the method of the invention may be freely practised without danger of toxic effect on animal life.

We claim:

1. A method of controlling the growth of algae and noxious weeds which comprises applying a compound selected from the group consisting of 1-phenazine carboxylic acid and hydroxy-phenazine-carboxylic acid to the growth environment of said algae and noxious weeds in the proportion of at least one-third of a pound per acre of said environment.

2. A method of controlling the growth of algae and noxious weeds as defined in claim 1, wherein said compound is applied as a solution.

3. A method of controlling the growth of algae and noxious weeds as defined in claim 1, wherein said compound is applied as a dry solid.

4. A method of controlling the growth of algae as defined in claim 1, wherein said growth environment is a body of water, and said compound is 1-phenazine carboxylic acid applied to said body of water in the proportion of at least 2.7 pounds per acre foot.

5. A method of controlling the growth of noxious weeds as defined in claim 1, wherein said growth environment is a soil area, and said compound is hydroxy-phenazine-carboxylic acid.

6. A method of controlling the growth of noxious weeds as defined in claim 1, wherein said environment is a body of water and said compound is 1-phenazine carboxylic acid applied to said body of water in the proportion of 6¾ pounds per acre foot.

7. A method of controlling the growth of pigweed and mustard as defined in claim 1, wherein said growth environment is a soil area and said compound is applied thereto in the proportion of about 10 pounds per acre.

8. A method of controlling the growth of pigweed and mustard as defined in claim 7, wherein said compound is applied to said soil area before emergence of pigweed and mustard foilage therefrom.

References Cited

UNITED STATES PATENTS

| | | | |
|---|---|---|---|
| 2,110,614 | 3/1938 | Vivian et al. | 167—33 |
| 2,986,493 | 5/1961 | Overeem et al. | 167—33 |

OTHER REFERENCES

Plant Regulators, CBSC Positive Data Series No. 2, June 1955, pp. a, b, c, 1 and 37.

Toohey et al., Canadian Journal of Botany, vol. 43, pp. 1151–1155, 1965.

LEWIS GOTTS, *Primary Examiner.*

JAMES O. THOMAS, JR., *Examiner.*

G. H. HOLLRAH, *Assistant Examiner.*